Aug. 8, 1944. R. H. WHISLER, JR 2,355,491
HYDRAULIC SHOCK ABSORBER
Filed March 22, 1943
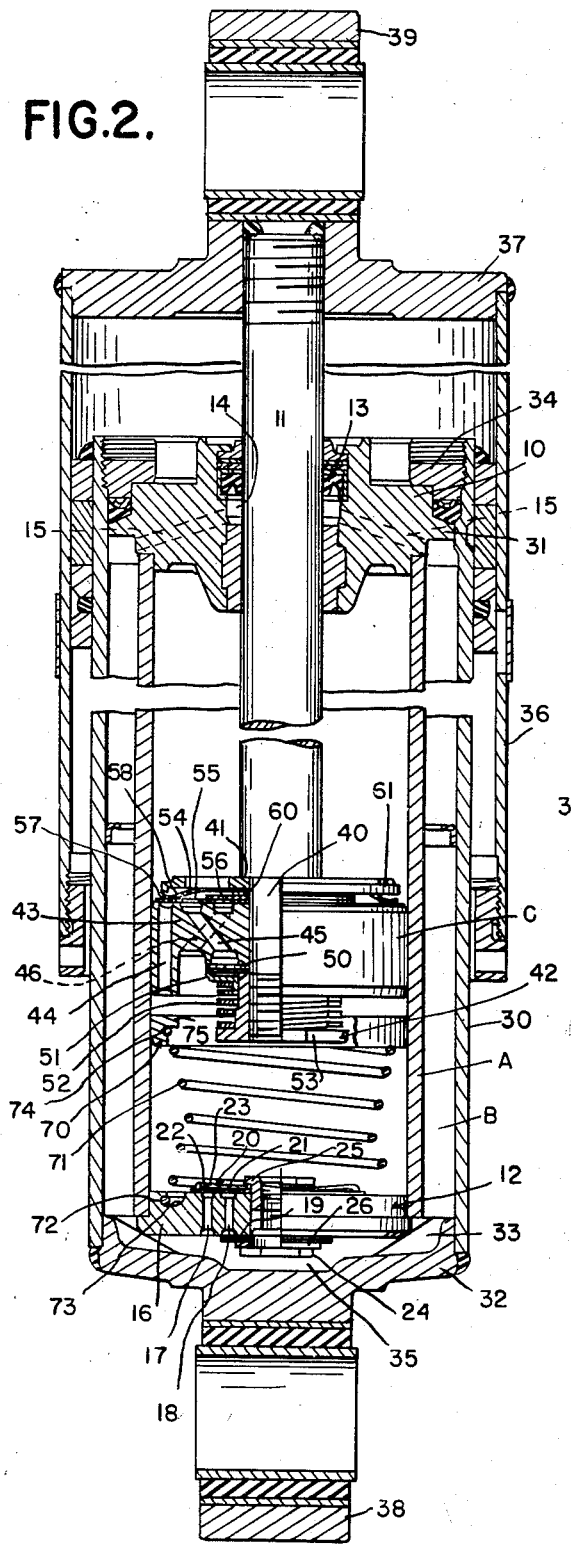
INVENTOR.
RALPH H. WHISLER JR.
BY
ATTORNEYS Patented Aug. 8, 1944

2,355,491

UNITED STATES PATENT OFFICE 2,355,491

HYDRAULIC SHOCK ABSORBER

Ralph H. Whisler, Jr., Monroe, Mich., assignor to Monroe Auto Equipment Company, Monroe, Mich., a corporation of Michigan Application March 22, 1943, Serial No. 480,081

16 Claims. (Cl. 188—88)

This invention relates generally to shock absorbers and refers more particularly to hydraulic shock absorbers of the direct acting type.

Heretofore shock absorbers have been provided with a certain amount of resistance to vehicle spring amplitudes and shock absorber movements, but usually there is insufficient resistance to compensate for increase in movements of the shock absorber, or there is no provision to give increased shock absorber resistance for increased vehicle spring amplitudes and shock absorber movements. As a result, the shock absorber does not function properly to obtain a smooth, even ride.

In the present instance, I have overcome the difficulties heretofore encountered by providing a variable control that not only will provide the proper resistance to take care of normal shocks, but will provide increased resistance for increased spring amplitudes and shock absorber movements.

In the accompanying drawing:

Figure 1 is a side elevation of a shock absorber embodying my invention;

Figure 2 is a longitudinal sectional view taken substantially on line 2—2 of Figure 1, with portions of the piston and compression valve assemblies in elevation.

Referring now to the drawing, A is the pressure cylinder containing a hydraulic medium, B is the reserve chamber for the hydraulic medium, and C is the reciprocating piston of a shock absorber structure embodying my invention.

As shown, the pressure cylinder A has a closure 10 at its upper end apertured to receive a rod 11 for the piston C and has a base compression valve assembly 12 at its lower end.

The closure 10 has a seal 13 preventing the escape of hydraulic medium along the rod 11 to the exterior of the shock absorber, a pocket 14 for receiving the hydraulic medium scraped off the rod 11 by said seal, and passages 15 for conducting such hydraulic medium from the pocket 14 to the reserve chamber B.

The compression valve assembly 12 has a body 16 rigid with the cylinder A and provided with two circular series of holes 17 and 18 respectively, a laminated leaf spring valve 19 on the underside of the body 16 extending across and normally closing the lower ends of the inner series of holes 18, and a spring pressed disc valve 20 on the upper side of the body 16 having openings 21 registering with and permitting free passage of hydraulic medium to the inner series of holes 18 but having an imperforate marginal portion 22 normally held by the spring 23 in closed position over the upper ends of the outer series of holes 17. Any suitable means such as the cooperating clamping nuts 24 and 25 respectively, and washer 26 carried by the body 16 at the center thereof may be employed to hold the valves 19 and 20 and spring 23 in proper assembled position with said body.

The reserve chamber B is provided between the pressure cylinder A and an outer cylinder 30 substantially concentric with said pressure cylinder A. A portion 31 of the closure 10 for the upper end of the pressure cylinder A projects laterally outward to the outer cylinder 30 and serves as a closure for the upper end of the outer cylinder, while a cap 32 is rigid with and forms a closure for the lower end of said cylinder 30. Any suitable means such as spaced ribs 33 on the cap 32 engaging the body 16 of the compression valve assembly at the lower end of the pressure cylinder A, and a clamping collar 34 seated on the closure 10 and threadedly engaging the outer cylinder 30 may be employed to hold the outer cylinder 30 in fixed relation to the pressure cylinder A. Preferably the construction and arrangement of the ribs 33 is such that the reserve chamber B is in open communication with the space 35 between the cap 32 and the body 16 of the compression valve assembly 12.

Located upon the outer side of and substantially concentric with the outer cylinder 30 is a tubular dust shield 36 that is preferably suspended from a cap 37 mounted upon the outer end of the piston rod 11. To enable the shock absorber to be connected to the sprung and unsprung assemblies (not shown) of a vehicle, or to any other elements of a device to be cushioned, the caps 32 and 37 are provided with apertured heads 38 and 39 respectively which project endwise from the shock absorber.

The piston C is mounted upon the reduced inner end portion 40 of the rod 11 between a shoulder 41 thereof and a suitable retaining nut 42 slidably engages the inner walls of the pressure cylinder A.

In the present instance, the piston C has a body 43 provided with three sets of open ended cylindrical passages 44, 45 and 46 respectively, that extend therethrough at circumferentially spaced points thereof.

The passages 46 incline upwardly from a large diameter circle at the bottom of the piston to a smaller diameter circle at the top of the piston. The passages 45 incline downwardly from a large diameter circle at the top of the piston to a smaller diameter circle at the bottom of the piston. The passages 44 extend vertically from top to bottom of the piston in a circle of greater diameter adjacent the side walls of the piston. Thus, the inclined passages 45 and 46 cross one another inside the circle of vertically extending passages 44.

On the underside of the piston C between the body 43 thereof and the retaining nut 42 is a leaf spring valve 50 which is normally held in closed position against the lower ends of the inclined passages 45 by means of a slidable washer 51 and a coil spring 52 sleeved on the nut 42 between the head 53 thereof and said sliding washer 51.

On the upper side of the piston C between the body thereof and the shoulder 41 of the rod 11 is a disc valve 54 having openings 55 and 56 respectively registering with the open upper ends of the passages 45 and 46, and having an imperforate marginal portion 57 normally held in closed position over the upper ends of the vertically extending passages 44 by means of a star-shaped spring 58.

On the upper side of the piston C between the disc valve 54 and the shoulder 41 of the rod is a laminated leaf spring valve 60 which normally closes the upper ends of the inclined passages 46.

By referring to Figure 2 it will be noted that an apertured backing plate 61 is provided on the reduced portion 40 of the rod between the shoulder 41 thereof and the star-shaped spring 58, and that the latter is between the plate 61 and the laminated spring valve 60. Hence, the plate 61, spring 58, valves 60 and 54, piston body 43, and valve 50 are held in assembled relation on the reduced portion 40 of the rod by tight adjustment of the nut 42 relative to the shoulder 41 of said rod.

Located below and entirely free of the piston C is an annulus 70 of inverted L cross section that normally is supported in spaced relation to the lower ends of the vertically extending passages 44 by means of a vertically extending coil spring 71 carried by the body 16 of the compression valve assembly. Preferably the lowermost convolution 72 of the spring 71 rests within a recess 73 in the body 16 of the compression valve assembly, while the uppermost convolution 74 of said spring engages the underside of the inward flange 75 of the annulus 70.

In use, when the heads 38 and 39 of the shock absorber are moved slowly toward each other on the compression stroke of the piston C during easy or boulevard riding conditions, the hydraulic medium in the lower portion of the cylinder A below the piston C will initially flow upwardly through the vertically extending passages 44 in the piston past the disc valve 54 to the space in the cylinder A above the piston. However, should the shock absorber movement increase on the compression stroke to the point where the piston C abuts the annulus 70 and thereby cuts off the upward flow of hydraulic medium through the vertically extending passages 44 in the piston, due to rougher riding conditions, then the hydraulic medium in the lower portion of the pressure cylinder A will flow upwardly through the inclined passages 46 in the piston past the laminated spring valve 60 to the space in the cylinder A above the piston. Thus, during normal operation of the shock absorber on the compression stroke of the piston C, the disc valve 54 for the vertically extending passages 44 will function to provide a low stage of resistance to the flow of hydraulic medium, while during abnormal operation of the shock absorber on the compression stroke of the piston the laminated spring valve 60 for the inclined passages 46 will function to provide a secondary high stage of resistance to the flow of hydraulic medium after the annulus 70 closes the lower ends of the vertically extending passages 44 in the piston. During the compression stroke of the piston C the laminated leaf spring valve 19 of the base valve assembly 12 will function in the usual manner to control the downward flow of hydraulic medium through the holes 18 from the space in the pressure cylinder A below the piston to the reserve chamber B.

When the heads 38 and 39 of the shock absorber are moved slowly away from each other on the rebound stroke of the piston C during easy or boulevard riding conditions, the disc valve 20 of the base valve assembly 12 will function in the usual manner to control the upward flow of hydraulic medium from the reserve chamber B to the lower portion of the pressure cylinder A, and the spring pressed valve 50 will resist the downward flow of hydraulic medium in the inclined passages 45 in the piston from the space in the cylinder A above the piston to the space in the cylinder below said piston. Thus, a single stage of resistance is provided by the spring pressed valve 50 on the rebound stroke of the piston.

In view of the foregoing, it will be apparent that the hydraulic medium is adapted to flow successively through the vertically extending passages 44 and inclined passages 46 in the piston during the compression stroke of said piston and is adapted to flow through the inclined passages 45 only in the piston during the rebound stroke of the piston. Hence, provision is made for two stages of resistance on the compression stroke and one on the rebound stroke of the piston.

What I claim as my invention is:

1. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, means normally closing one set of passages and operable to offer a low stage of resistance to the flow of hydraulic medium through said passages, means operable when movement of the piston in the direction aforesaid is increased to cut off the flow of hydraulic medium through the first mentioned set of passages, and means normally closing the second set of passages and operable when the flow of hydraulic medium through the first set of passages is cut off to offer a secondary high stage of resistance to the flow of hydraulic medium through the second set of passages.

2. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, relatively unconstrained means normally closing one set of passages and operable to offer a low stage of resistance to the flow of hydraulic medium through said passages, means operable when movement of the piston in the direction aforesaid is increased to cut off the flow of hydraulic medium through the first mentioned set of passages, and relatively stiff means normally closing the second set of passages and operable when the flow of hydraulic medium through the first set of passages is cut off to offer a secondary high stage of resistance to the flow of hydraulic medium through the second set of passages.

3. A hydraulic shock absorber having a cylinder containing a hydraulic medium and provided at one end with a compression valve assembly, a piston movable within the cylinder and having two sets of passages through which hydraulic medium in the cylinder is adapted to flow during movement of the piston toward the compression valve assembly, and means operable during movement of the piston toward said compression valve assembly for causing hydraulic medium to flow successively through the two sets of passages, a part of said means being yieldably supported from said compression valve assembly in the path of and engageable with the piston.

4. A hydraulic shock absorber having a cylinder containing a hydraulic medium and provided at one end with a compression valve assembly, a piston movable within the cylinder and having two sets of passages through which hydraulic medium in the cylinder is adapted to flow during movement of the piston toward the compression valve assembly, and means operable during movement of the piston toward said compression valve assembly for causing hydraulic medium to flow successively through the two sets of passages, including a valve for one set movable with the piston, and a member for closing the other set yieldably supported from the compression valve assembly in the path of movement of the piston.

5. A hydraulic shock absorber having a cylinder containing a hydraulic medium, a piston slidable in the cylinder and having two sets of passages through which hydraulic medium is adapted to flow during movement of the piston in one direction in the cylinder, means normally closing one set of passages and operable during movement of the piston in said direction to resist the flow of hydraulic medium through said passages, means entirely free of the piston and operable during continued movement thereof in said direction to cut off the supply of hydraulic medium to said one set of passages, and means normally closing the second set of passages and operable when the supply aforesaid to said one set of passages is cut off to resist the flow of hydraulic medium through the second set of passages.

6. A hydraulic shock absorber having a cylinder containing a hydraulic medium, a piston slidable in the cylinder and having two sets of passages through which hydraulic medium is adapted to flow during movement of the piston in one direction in the cylinder, two closures for one set of passages, one of said closures being normally closed but yieldable to resist the flow of hydraulic medium through said set of passages, the other of said closures being normally open and entirely free of the piston but operable during travel of the piston in said direction to cut off the supply of hydraulic medium to said set of passages, and means normally closing the second set of passages but yieldable when the supply aforesaid to the first set is cut off to resist the flow of hydraulic medium through the second set of passages.

7. A hydraulic shock absorber having a cylinder containing a hydraulic medium, a piston slidable in the cylinder and having two sets of passages through which hydraulic medium is adapted to flow during movement of the piston in one direction in the cylinder, and two closures for one of the two sets of passages, one of said closures being normally closed but operable to resist the flow of hydraulic medium through said set of passages, the other of said closures being normally open but operable during travel of the piston in said direction to cut off the supply of hydraulic medium to said set of passages.

8. A hydraulic shock absorber having a cylinder containing a hydraulic medium, a piston slidable in the cylinder and having a set of passages through which hydraulic medium is adapted to flow during movement of the piston in one direction in the cylinder, and two closures for said set of passages, one of said closures being normally closed but operable to resist the flow of hydraulic medium through said set of passages, the other of said closures being normally open but operable during travel of the piston in said direction to cut off the supply of hydraulic medium to said set of passages.

9. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, means normally closing one set of passages and operable during initial movement of the piston in said direction to offer one stage of resistance to the flow of hydraulic medium through said passages, a normally open closure for said one set of passages, said closure being in the path of the piston when moving in the one direction aforesaid and operable after the piston has moved a predetermined distance in said direction to cut off the flow of hydraulic medium through the said one set of passages, and means normally closing and preventing hydraulic medium from flowing through the second set of passages, the last mentioned means being operable after the flow of said medium through the first mentioned set is cut off to offer a different stage of resistance to the flow of hydraulic medium through the second set of passages.

10. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, means normally closing one set of passages, means normally closing the second set of passages, and means operable upon a predetermined movement of the piston in the direction aforesaid for cutting off the flow of hydraulic medium through one of the sets of passages.

11. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, a valve normally closing one set of passages, an independently operable valve normally closing the second set of passages, and a member free of but engageable with the piston when it reaches a predetermined point during travel thereof in the direction aforesaid for cutting off the flow of hydraulic medium through one of the sets of passages.

12. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, independently operable valves normally closing the two sets of passages, and means operable to cut off the supply of hydraulic medium to one of the two sets of passages during movement of the piston in the one direction.

13. A hydraulic shock absorber having a cylinder containing a hydraulic medium, a piston slidable in the cylinder and having two sets of passages through which hydraulic medium in the cylinder is adapted to flow upon movement of the piston in one direction in the cylinder, and members above and below the piston operable to control the flow of hydraulic medium through the two sets of passages during movement of the piston in the one direction, one of said members being connected to the piston and normally closing one set of passages, another of said members being free of the piston but operable when it reaches a predetermined point during travel thereof in the direction aforesaid to cut off the flow of hydraulic medium to the first mentioned set of passages.

14. A hydraulic shock absorber having a cylinder containing a hydraulic medium, a piston slidable in the cylinder and having two sets of passages through which hydraulic medium is adapted to flow during movement of the piston in one direction in the cylinder, a valve normally closing one set of passages and operable during movement of the piston in said direction to resist the flow of hydraulic medium through said one set of passages, means entirely free of the piston and operable during continued movement thereof in said direction to cut off the supply of hydraulic medium to said one set of passages, and a valve normally closing the second set of passages and operable when the supply aforesaid to said one set of passages is cut off to resist the flow of hydraulic medium through the second set of passages.

15. A hydraulic shock absorber having a cylinder containing a hydraulic medium, a piston slidable in the cylinder and having two sets of passages through which hydraulic medium is adapted to flow during movement of the piston in one direction in the cylinder, a valve normally closing one set of passages and operable during movement of the piston in said direction to resist the flow of hydraulic medium through said one set of passages, a member yieldably supported in the cylinder in spaced relation to the piston and operable during continued movement of the piston in said direction to cut off the supply of hydraulic medium to said one set of passages, and a valve normally closing the second set of passages and operable when the supply aforesaid to said one set of passages is cut off to resist the flow of hydraulic medium through the second set of passages.

16. A hydraulic shock absorber having a cylinder containing a hydraulic medium, a piston slidable in the cylinder and having two sets of passages through which hydraulic medium is adapted to flow during movement of the piston in one direction in the cylinder, two independent closures for one set of passages, one of said closures being operable to resist the flow of hydraulic medium through said one set of passages, the other of said closures being operable during travel of the piston in said direction to cut off the supply of hydraulic medium to said one set of passages, and means normally closing the second set of passages but operable when the supply aforesaid to said one set is cut off to resist the flow of hydraulic medium through the second set of passages.

RALPH H. WHISLER, Jr.